Oct. 22, 1963

R. C. HENNEMAN 3,107,899

TRACTOR WINCH

Filed March 21, 1960

INVENTOR
RICHARD C. HENNEMAN

BY *Barner & Seed*

ATTORNEYS

Oct. 22, 1963   R. C. HENNEMAN   3,107,899
TRACTOR WINCH

Filed March 21, 1960

INVENTOR.
RICHARD G. HENNEMAN
BY

Oct. 22, 1963 R. C. HENNEMAN 3,107,899
TRACTOR WINCH
Filed March 21, 1960 3 Sheets-Sheet 3

INVENTOR
RICHARD C. HENNEMAN
BY
ATTORNEYS

United States Patent Office
3,107,899
Patented Oct. 22, 1963

3,107,899
TRACTOR WINCH
Richard C. Henneman, Renton, Wash., assignor to Pacific Car and Foundry Company, Renton, Wash., a corporation of Washington
Filed Mar. 21, 1960, Ser. No. 16,463
3 Claims. (Cl. 254—187)

This invention relates to a tractor winch, particularly one which drives through a friction clutch, and has for its general object the provision of a winch of this character in which the friction clutch is a multiple-disc affair hydraulically applied and incorporating in conjunction a brake which is spring applied and hydraulically released.

As a further important object the invention aims to provide a tractor winch in which the winch lubricant serves as the hydraulic fluid.

The invention has the yet further and important object of providing a tractor winch which is powered off a constantly running PTO shaft, with the said winch controls being entirely independent of the tractor controls, hence permitting the winchline to be spooled in or out while the tractor is in motion.

With the foregoing objects and advantages in view, and otherwise looking to the provision of a rugged winch of advanced construction which is unusually efficient in operation, the invention consists in the novel construction and in the adaptation and combination of parts hereinafter described and claimed.

Figure 2:
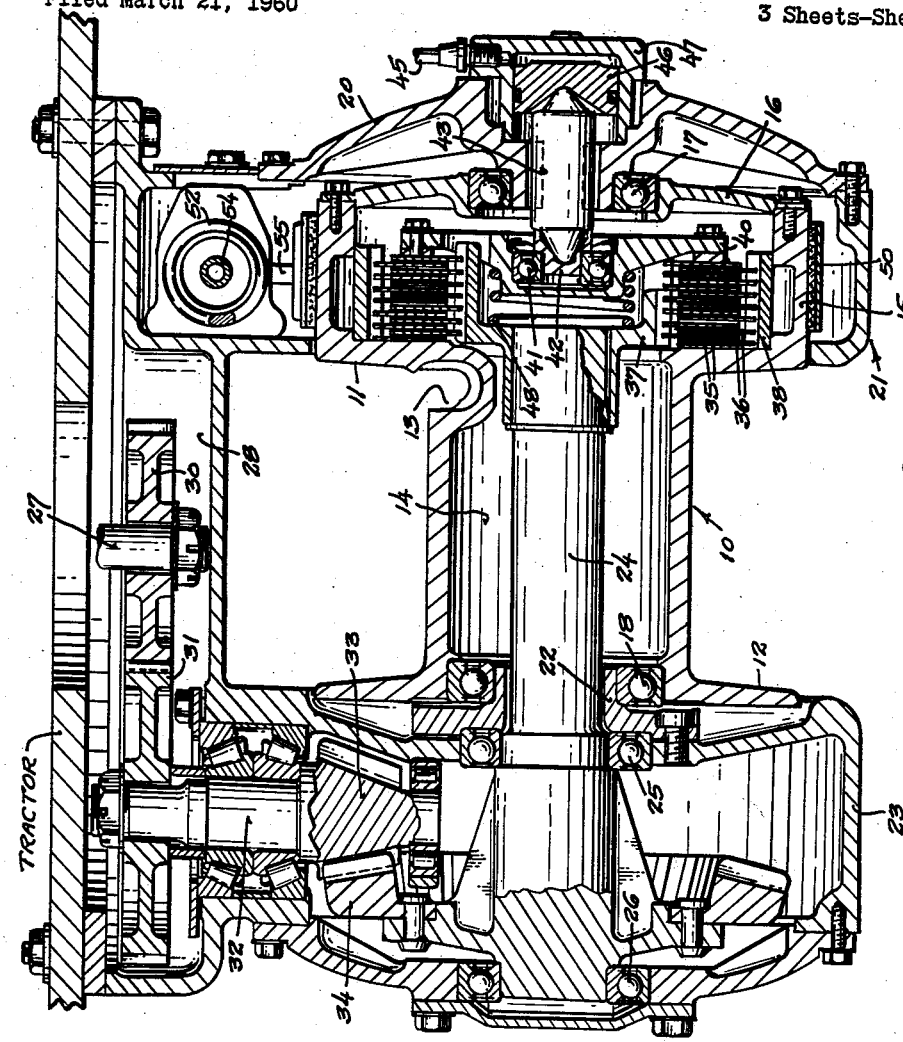
FIG. 2 is a horizontal sectional view drawn to an enlarged scale on line 2—2 of FIG. 4, with the driving end of a tractor's "take-off" shaft, as well as a hydraulic line to the operating cylinder for the clutch, shown fragmentarily.
Figure 1:
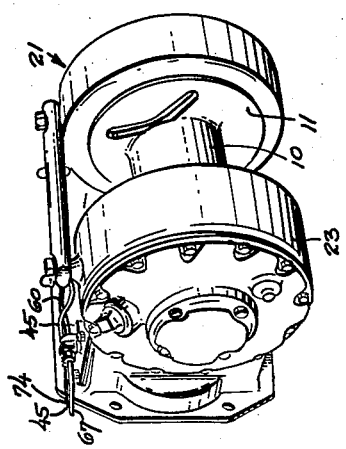
FIGURE 1 is a perspective view portraying the tractor winch of the present invention, shown unattached, and with control lines which lead between the winch proper and an associated control valve illustrated fragmentarily.

Referring to said drawings the numeral 10 designates a winding drum provided with flanged ends 11 and 12, and having a ferrule-engaging socket 13 by which the root end of a cable (not shown) is attached to the drum. The drum has a through-opening 14 along its axial center. For ease of description the ends of the drum which lie to the right and to the left, as viewed in FIG. 2, will be termed the front and the rear end, respectively. The front end has a concentric rim 15 projected forwardly from the outer perimeter of the flange 11. A cover 16 is bolted to this rim so as, with the flange and the rim, to define an annular chamber arranged to house the clutch of the present invention.

The journals for the two ends of the drum are provided by ball bearings. Denoted by 17, the front bearing incorporates oil seals. Its outer race fits a suitable seat provided by the cover 16. Its inner race seats on a hub section provided by a plate 20 bolted as a closure to the front end of a winch case 21. The rear bearing 18 fits between the drum's inner surface and an annular bearing carrier 22 which is bolted to the forward wall of a gear housing 23 which is made an integral part of the winch case at its rear end. The wall 20 with the portion of the winch case to which it is attached produces a hollow front bitt for the winch. The gear housing 23 produces a hollow rear bitt for the winch.

A shaft 24 driven from a tractor's PTO shaft by a train of reduction gearing extends axially of the winch case through said center openings of the bearing carrier and the drum from the chamber of the gear housing to the chamber of the clutch housing. This driven shaft is journaled by bearings 25 and 26. The PTO shaft is denoted by 27. Located substantially at right angles to the driven shaft 24, said PTO shaft enters a back cavity 28 of the winch case, passing the drive therein by intermeshing reduction spur pinions 30 and 31 to a jack-shaft 32. The jack-shaft drives the driven shaft 24 by means of reduction bevel gears 33 and 34 which are straddle-mounted in each instance.

The clutch is a multiple disc affair employing the usual alternating friction and steel discs 35 and 36 splined one to a clutch hub 37 keyed or otherwise secured to the front end of the driven shaft 24 and the other to a ring 38 welded to the interior face of the winding drum's rim 15. The set of clutch discs lie between the front face of the flange 11 and a thrust head 40 journaled by a ball bearing 41 upon a thrust plug 42. A push rod 43 mounted for endwise motion on an axis coinciding with that of the drum shaft, working within a center opening of the closure plate 20, provides both an inwardly and outwardly protruding nose. The inwardly protruding nose bears against the thrust plug 42. The outwardly protruding nose bears against a piston 46 working in a hydraulic cylinder 47 which is boltably secured to the closure plate 20. The pressure of hydraulic fluid supplied by a pipe 45 to the cylinder forces the piston inwardly against the yielding opposition of a return spring 48.

Figure 3:
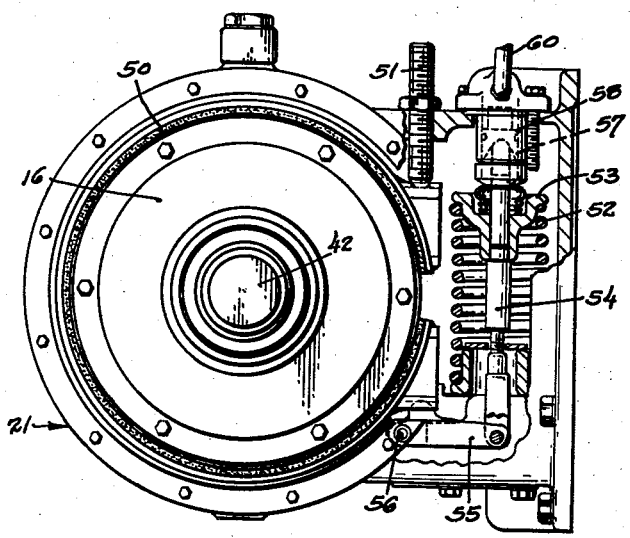
FIGS. 3 and 4 are reduced-scale elevations viewing the winch from opposite ends and in each instance broken away to illustrate interior structure.

The exterior surface of the rim 15 performs the function of a brake drum. As can be best seen from an inspection of FIG. 3, the brake for such drum is not of the self-energizing character. A single-wrap band 50 has one end adjustably anchored by a screw 51. The band is normally urged by the presure of a spring 52 into braking engagement with the drum. The force of such spring is passed by a keeper 53 to a thrust rod 54. Such rod has its lower end yoked to a lever 55. This is a lever of the second order, fulcrumed at 56. The upper end of the thrust rod bears against a piston 57 working in an oil cylinder 58. Pressure of hydraulic fluid supplied by a pipe 60 to the cylinder forces the piston downwardly against the yielding opposition of the spring 52.

Figure 4:
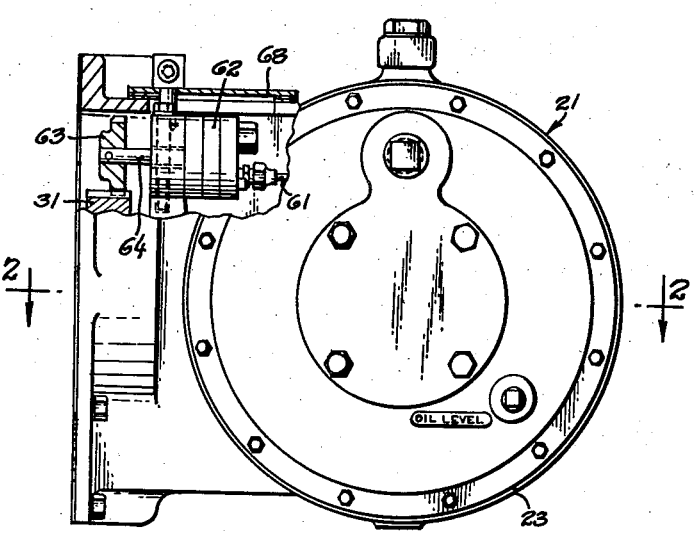
Figures 5, 6:
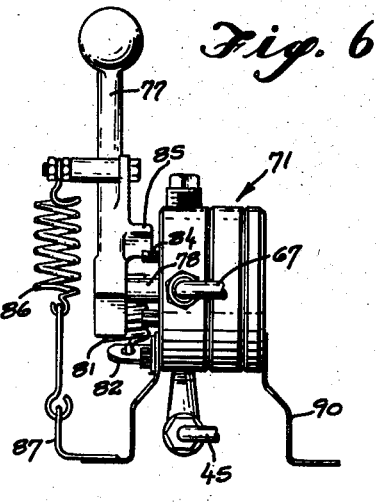
FIG. 5 is a front elevational view of one embodiment of a suitable 4-way control valve for the winch, and showing the control handle in clutch-applying position.
FIG. 6 is a side elevational view of said control valve.

Winch oil is used as the hydraulic fluid. The gear housing 23 serves as the reservoir therefor, and is drawn therefrom through a pipe 61 to a rotary pump 62 (see FIG. 4) mounted in the winch case immediately above the jack-shaft 32. A pinion 63 on the pump shaft 64 meshes the spur pinion 31.

A supply pipe 65 from the pressure side of the pump connects directly with the pipe 60 for the brake-release cylinder 58, and also by pipes 66 and 67 with a pressure-relief valve 70 and a control valve 71, respectively. The relief valve dumps by a pipe 72 into the reservoir.

Figure 7:
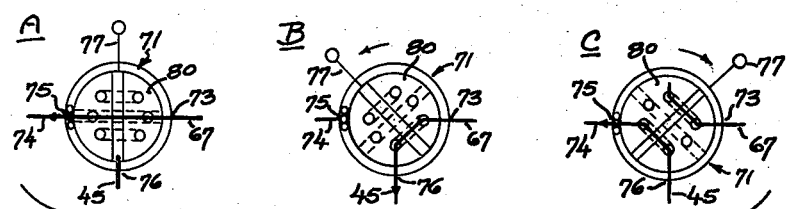
FIG. 7 is a schematic view illustrating the three positions into which the control valve may be placed.
Figure 8:
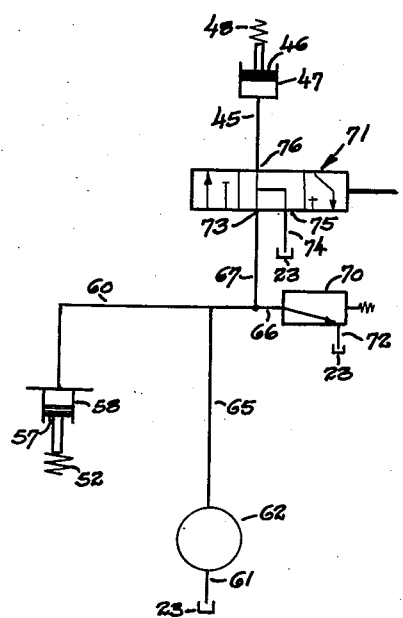
FIG. 8 is a schematic lay-out of the hydraulic system.

The control valve, designated generally by 71, is desirably located remote to the winch in a position convenient to the operator of a tractor on which the winch is mounted. As here illustrated the same is an open-center four-way rotary valve having one of its four ports plugged. The pipe 67 connects with one of the remaining three ports, designated by 73. In addition to the supply pipe, two other oil-flow pipes extend between the winch and the control valve. One is a pipe 74 and leads to the reservoir from a valve port 75. The other is the pipe 45 and connects the remaining valve port, designated by 76, with the clutch cylinder 47. The rotary valve which I have elected to show is a product of Road Machinery Company, Grand Rapids, Michigan, Monarch Model. The operating handle 77 attaches to an exposed stem prolongation 78 of the valve core 80 and has two arms 88 and 89 offset from said stem projecting from the handle in opposite directions normal to a plane including the handle and the axis about which the stem turns. One arm 88 connects by a spring 81 to an ear 82 fixed to the valve body and acts to exert a yielding force urging the valve handle in one direction of rocking motion. Such rocking motion is limited by two stops 83 and 84 engaged by a lug 85. The other arm 89 of the valve handle connects by a spring 86 to an ear 87 fixed to a mounting base 90 for the valve body, and similarly acts to exert a yielding force urging the valve handle in the other direction of its permitted rocking motion. The two springs substantially balance one another so as normally to position the valve handle in the centered position shown at "A" in FIG. 7. Said spring 86 is, however, so placed that when the handle is moved to the position shown at "C" in FIG. 7, the spring moves through and beyond center. This "over-center" action causes the two springs to act in concert whereupon the handle is yieldingly held in such position. The handle will remain in the position shown at "B" in FIG. 7 only by continued exertion of hand pressure, returning automatically to the centered "A" position upon release of such pressure. "A," "B" and "C" are braking, cable-winding, and free-spooling positions, respectively, and will be hereinafter so termed. A shuttle valve functioning to a similar end can be employed if desired in lieu of the rotary valve and I have incorporated a symbolic showing thereof in the schematic lay-out of FIG. 8.

The single-lever control provided by the present invention permits one-man operation. The system is "fail safe." Should the operator be incapacitated for any reason whatever, the clutch releases and the brake is set. If the load stalls the engine the clutch releases and the brake is set. The PTO shaft must be turning to operate the winch.

To trace the hydraulic circuit, let it be assumed that the handle is in its spring-centered braking position "A." Pressure oil then feeds from pipe 65 and pipe 67 to the port 73 of the control valve. The valve core channels the oil to exhaust port 75 and thence by return pipe 74 to the reservoir, consequently relieving piston 57 of any pressure. The brake band 50 grips the brake drum 15 by the action of the spring 52. Assume now that the handle of the control valve is pushed to the "B," or cable-winding, position. This closes port 75 and brings ports 73 and 76 into communication. In consequence thereof, oil under pressure of the pump feeds by pipe 60 to the brake cylinder 58 and by connecting pipes 67 and 45 to the clutch cylinder 47. The brake is thereupon released coincident with an application of the clutch. It is again pointed out that this position of the handle requires that application of hand pressure be maintained.

This second position of the handle pressurizes both the clutch and brake cylinders to a pressure of, say, 1000 p.s.i. The clutch cylinder then applies a force of 4000 pounds on the clutch pack. Excess oil is spilled over the relief valve back into the oil reservoir of the winch case. The friction clutch allows the winch line to be retrieved while the tractor is in motion, an action which may be referred to as "winching on the fly." The load may be dropped, the tractor moved ahead, and the load retrieved without stopping the tractor. This has especial advantage when momentarily poor traction conditions or adverse grades are encountered. When a steep downgrade is being traversed while ground-skidding a log, the load may be left at the top of the grade by free-spooling the winch and again retrieved when the tractor is on the flat, all without stopping the tractor. Since retrieving is or may be accomplished while the tractor is in motion the tractor momentum can be employed to initiate motion of the load.

Considering the free-spooling position of the control valve, the inlet port 73 is then blocked off and ports 75 and 76 are in communication so that the clutch pack is free of activating pressure. The pump supply pipe 65 now feeds only to the pipe 60 and releases the spring-set brake against the yielding pressure of its spring 52.

It is believed that the invention will have been clearly understood from the foregoing detailed description of my now preferred illustrated embodiment. Several features not hereinabove mentioned should perhaps be noted. The multiple-disc friction clutch is sealed against entry of mud and water with no adjustment being required during the life of the unit. The full-wrap brake band has identical fittings on each of its two ends, each such fitting adapting itself to taking thrust from either the adjusting screw 51 or the braking lever 55, thus allowing the brake band to be reversed at will for equalizing wear. The drum of the winch is mounted on ball bearings supported directly by the winch case so that drum loads cannot affect gear train alignment. Hydraulic components including the pump (see access plate 68 in FIG. 4) can be removed and replaced without disassembling the winch or removing the winch from the tractor.

Changes in details of construction will suggest themselves and may be resorted to without departing from the teachings of the invention. It is accordingly my intention that no limitations be implied and that the hereto annexed claims be given the broadest interpretation to which the employed language fairly admits.

What I claim is:

1. In a winch, a terminally flanged winch drum provided with a through-opening in its center and having an annular concentric rim projecting as an axial prolongation of the drum beyond one of said flanges, a centrally apertured cover bolted to the facing edge of said rim and acting with said rim and the related flange to define an end pocket, a driven shaft extending through said hollow center of the drum into said end pocket, a clutch hub splined to the shaft within said pocket, a multiple-disc clutch pack received in said pocket between said clutch hub and the annular rim with the discs splined, alternately, to the hub and to the rim, a thrust head bolted to the outermost disc of said clutch pack, a compression spring received between the thrust head and the clutch hub for normally holding the clutch in a released condition, a thrust plug journaled from the thrust head for relative rotation about an axis coinciding with the shaft, a winch case, a removable facing plate for said winch case supporting a hydraulic piston-and-cylinder assembly in a position co-axial to and spaced to the front of said thrust plug, and a push-rod extending through said central aperture of the cover from the piston to the thrust plug for transmitting hydraulic force from the piston to the thrust plug and thence through the thrust head to the clutch pack for engaging the clutch against the yielding pressure imposed by the spring, said facing plate when removed completely exposing the cover so that upon a removal of the latter the assembly of clutch hub, clutch discs, thrust head, and thrust plug can be removed bodily simply by slipping the spline-mounted hub off the shaft.

2. In a winch, a winding drum formed with a through-opening in its center and having an annular rim extending as an axial prolongation from the front end, front and aft cheek bitts providing journal mountings for the ends of the drum, each of said cheek bitts being hollow so as to provide a chamber therein and each providing a center opening in its inner wall giving access from the respective chamber to the hollow center of the drum, a driven shaft extending through said hollow center of the drum from one to the other of said bitt chambers, power-driven reduction gearing received in said aft chamber and driving the aft end of the driven shaft, a clutch hub received in said front chamber and secured to the front end of the driven shaft, a multiple disc clutch pack received between said clutch hub and the annular rim with the discs splined, alternately, to the hub and to the rim, spring-pressed means acting to normally brake said annular rim, spring-pressed means acting to normally disengage the clutch, a respective hydraulic piston-and-cylinder thrust means one for releasing the brake against the pressure of the concerned spring and the other for engaging the clutch against the pressure of the concerned spring, said springs being each a compression spring and being mounted co-axial to the piston of the concerned thrust means, and a 3-position single-lever manual control common to both of said thrust means so operatively interconnected with the two that in one position of said lever the former thrust means operates independently of the latter thrust means for free-spooling the drum, in a second position the two are operated in concert for winding cable on the drum, and in the third position both are held inactive for locking the drum while permitting continued powering of the driven shaft, the drum having a terminal flange from the outer perimeter of which said rim is axially prolonged, and having a centrally apertured cover bolted by its perimeter to the facing edge of the rim, said cover together with the rim and the flange forming a housing for said clutch pack, the concerned piston-and-cylinder assembly being carried by the front bitt in a position spaced to the front of said cover co-axial with the drum, the winch having an annular thrust plate for the clutch pack, a non-rotary thrust plug located central to the thrust plate, a journal bearing carried by said thrust plug and in turn carrying the thrust plate and also serving to pass thrust from the plug to the plate, and a push rod engaged by the concerned piston and engaging the thrust plug for applying endwise force from the piston to the clutch pack, said push rod projecting through said central aperture of the cover into the clutch housing.

3. In a winch, a winding drum formed with a through-opening in its center and having an annular rim extending as an axial prolongation from the front end, front and aft cheek bitts providing journal mountings for the ends of the drum, each of said cheek bitts being hollow so as to provide a chamber therein and each providing a center opening in its inner wall giving access from the respective chamber to the hollow center of the drum, a driven shaft extending through said hollow center of the drum from one to the other of said bitt chambers, power-driven reduction gearing received in said aft chamber and driving the aft end of the driven shaft, a clutch hub received in said front chamber and secured to the front end of the driven shaft, a multiple-disc clutch pack received between said clutch hub and the annular rim with the discs splined, alternately, to the hub and to the rim, spring-pressed means acting to normally brake said annular rim, spring-pressed means acting to normally disengage the clutch, a respective hydraulic piston-and-cylinder thrust means one for releasing the brake against the pressure of the concerned spring and the other for engaging the clutch against the pressure of the concerned spring, said springs being each a compression spring and being mounted co-axial to the piston of the concerned thrust means, and a 3-position single-lever manual control common to both of said thrust means so operatively interconnected with the two that in one position of said lever the former thrust means operates independently of the latter thrust means for free-spooling the drum, in a second position the two are operated in concert for winding cable on the drum, and in the third position both are held inactive for locking the drum while permitting continued powering of the driven shaft, said reduction gearing being powered by the power take-off of a tractor and comprising: a jack shaft, intermeshing spur gears passing the drive from the power take-off shaft to said jack-shaft, and two intermeshing bevel gears passing the drive from the jack-shaft to the driven shaft, said two intermeshing bevel gears being each straddle-mounted, which is to say that journal bearings are provided both at the front and at the rear of each of said two intermeshing bevel gears, said journal bearings for said two intermeshing bevel gears being separate from the journal mountings for the drum.

References Cited in the file of this patent

UNITED STATES PATENTS

| | | |
|---|---|---|
| 2,138,824 | Yount | Dec. 6, 1938 |
| 2,502,898 | Spitzer | Apr. 4, 1950 |
| 2,522,089 | Bridwell et al. | Sept. 12, 1950 |
| 2,547,038 | Parrish | Apr. 3, 1951 |
| 2,676,497 | Ahlen | Apr. 27, 1954 |
| 2,676,785 | Mork | Apr. 27, 1954 |